(12) United States Patent
Jastrzembski

(10) Patent No.: US 11,233,431 B2
(45) Date of Patent: Jan. 25, 2022

(54) PROTECTOR FOR A ROTOR OF AN ELECTRICAL MACHINE

(71) Applicant: WITTENSTEIN SE, Igersheim (DE)

(72) Inventor: Jan-Peter Jastrzembski, Würzburg (DE)

(73) Assignee: WITTENSTEIN SE, Igersheim (DE)

( * ) Notice: Subject to any disclaimer, the term of this patent is extended or adjusted under 35 U.S.C. 154(b) by 258 days.

(21) Appl. No.: 16/657,066

(22) Filed: Oct. 18, 2019

(65) Prior Publication Data

US 2020/0127513 A1    Apr. 23, 2020

(30) Foreign Application Priority Data

Oct. 18, 2018   (DE) .......................... 102018125936.0

(51) Int. Cl.
    *H02K 1/28*        (2006.01)
    *H02K 1/27*        (2006.01)

(52) U.S. Cl.
    CPC ................. *H02K 1/28* (2013.01); *H02K 1/27* (2013.01)

(58) Field of Classification Search
    CPC ............ H02K 1/28; H02K 1/27; H02K 1/278; H02K 1/30
    See application file for complete search history.

(56) References Cited

U.S. PATENT DOCUMENTS

| | | | |
|---|---|---|---|
| 2,493,102 A | 1/1950 | Brainard | |
| 4,433,261 A | 2/1984 | Nashiki et al. | |
| 4,906,882 A | 3/1990 | Erndt et al. | |
| 7,365,465 B2 * | 4/2008 | Ludwig | H02K 1/278 310/156.12 |
| 2006/0158053 A1 * | 7/2006 | Aschoff | H02K 1/30 310/91 |
| 2007/0096571 A1 * | 5/2007 | Yuratich | H02K 1/146 310/87 |
| 2014/0028119 A1 * | 1/2014 | Sagalovskiiy | H02K 5/132 310/43 |

FOREIGN PATENT DOCUMENTS

| | | |
|---|---|---|
| EP | 2731234 A1 | 5/2014 |
| GB | 2485790 A | 5/2012 |
| JP | 2007209169 A | 8/2007 |
| WO | 2004113670 A2 | 12/2004 |
| WO | 2017/102182 A1 | 6/2017 |

OTHER PUBLICATIONS

German Patent Application No. 10 2018 125 936.0, Search Report dated Aug. 5, 2019.
Office Action in connection to Spanish Application No. 201930922, dated Jul. 16, 2021.
Search Report and Written Opinion issued for Spanish Application No. 201930922, dated Jan. 24, 2020.

* cited by examiner

*Primary Examiner* — Thomas Truong
(74) *Attorney, Agent, or Firm* — Meunier Carlin & Curfman LLC

(57) ABSTRACT

A rotor for an electrical machine, comprising a motor shaft and a distributed arrangement of permanent magnets on said motor shaft, which are secured against displacements in the axial direction of the rotor by a protector, wherein the protector comprises at least two annular segments.

16 Claims, 3 Drawing Sheets

PROTECTOR FOR A ROTOR OF AN ELECTRICAL MACHINE

CROSS REFERENCE TO RELATED APPLICATION

This application claims priority to and benefit of application DE 102018125936.0 filed 18 Oct. 2018, which is fully incorporated by reference and made a part hereof.

FIELD OF THE INVENTION

The invention relates to an axial magnet protector for the rotor of an electrical machine and to the use of a rotor in an environment affected by mechanical vibrations, such as an electrical machine which incorporates a rotor.

PRIOR ART

Under certain circumstances, electric drive systems are susceptible to failure in response to severe impacts and vibrations.

From the prior art, rotors for electrical machines are known which can be employed, for example, in a synchronous motor, a synchronous generator or a brushless DC motor (DE 10 2013 020 360 A1). These rotors comprise a central shaft section, upon which magnets are adhered in a distributed arrangement about the circumferential direction of the shaft, which are secured against slippage by means of a protector.

However, known solutions from the prior art involve restrictions with respect to the construction of the rotor.

DISCLOSURE OF THE INVENTION

The object of the invention is the provision of an improved and/or flexibly applicable device for the protection of permanent magnets on a motor shaft.

According to one aspect of the invention, a rotor for an electrical machine is provided, comprising a motor shaft and a distributed arrangement of permanent magnets on said motor shaft, which are secured against displacements in the axial direction of the rotor by a protector, wherein the protector comprises at least two annular segments.

A further aspect of the invention relates to an electrical machine having a rotor in one of the typical forms of embodiment described herein.

A further aspect of the invention relates to the use of a rotor in one of the typical forms of embodiment described herein, in an environment affected by mechanical vibrations.

Typical protectors in the context of the invention can be fitted, even when the motor shaft, the rotor or the shaft feature interference contours such that, for example, an axial push-on fitting of a protector configured as a ring is not possible in the corresponding location, on the grounds of axial undercuts. The degree of freedom in the construction of the rotor is increased.

Forces acting on permanent magnets can be applied radially, in the form of centrifugal force, tangentially, for example in the form of a working torque, or axially, for example when an environment featuring strong mechanical vibrations or strong impact forces acts upon the rotor.

The fitting of magnets is generally complicated, and can be simplified by the solution described herein.

Typically, protectors are produced from materials having a low magnetic permeability, in order to ensure that a magnetic flux is not short-circuited by the protector.

Typical motor shafts are provided for use in an electrical machine, for example in an electric drive system, or are fitted in an electrical machine, wherein the electrical machine, for example, incorporates at least one of the following components: a motor housing, one or more stator plate stacks with windings incorporated therein, one or more end brackets, and built-on components such as, for example, covers, terminal housings or shroudings. Depending upon construction, it is possible, for example, for these components to be mutually combined or integrally configured.

The term motor shaft includes, for example, shafts or rotors which, for example, are solid or hollow, or are of one-piece or multi-piece construction. In forms of embodiment, the motor shaft is of one-piece construction, and is configured as a hollow shaft. In typical forms of embodiment of the invention, the protector comprises at least two annular segments.

In typical forms of embodiment, the annular segments can be produced from a prefabricated fully-circumferential ring, or can be produced as individual components. In the event of a plurality of annular segments, the distribution thereof over the circumference of the shaft is typically constituted of annular segments of equal size, thus corresponding, for example, to a maximum of one half of the shaft circumference, where two annular segments are provided. Thus, in a two-piece embodiment, the angle assumed by the annular segments can be typically at least 160°, typically at least 170°, typically at least 175°, typically at least 179°, or typically less than 180°. Essentially, typical forms of embodiment assume a circumferential angle of at least 180°.

In typical forms of embodiment of the invention, which comprise three or more annular segments, said annular segments encompass at most the corresponding proportion of the shaft circumference, depending upon the number of annular segments.

In further forms of embodiment, the annular segments can encompass different proportions of the circumferential angle of the shaft. In the case of two annular segments, for example, one annular segment can essentially encompass at least one third of the circumference, and the other can essentially encompass at least two thirds of the shaft. Typically, other circumferential distributions are possible.

Typically, the protector fully encloses the motor shaft, or specifically fully encloses the motor shaft along a circumference of said motor shaft, in the fitted state. Herein, full enclosure typically signifies that at least 95% or at least 98% of the circumference is enclosed. In typical forms of embodiment, with a fully enclosed motor shaft, there remains at most, for example, a small gap between the annular segments upon assembly, such that the system is not overstressed. Typically, the gap is very small, for example at least 0.1 mm, typically at least 0.5 mm, typically at least 1 mm, or typically less than 5 mm. Typical gaps have a width of at least 0.01°, or at least 0.1°, or at least 1°, or no more than 5°. Typical gaps encompass an angular range of less than 90°, typically less than 20°, typically less than 10°, and typically less than 2°. For example, it is also possible for the protector to encompass only parts of the shaft circumference at the fitting location, such that protection of the distributed arrangement of permanent magnets is provided in an axial direction of the rotor.

In typical forms of embodiment of the invention, the internal diameter of the protector is smaller than the shaft diameter of an interference contour of the rotor. An interference contour is a contour which prevents the push-on fitting of a full ring onto the shaft at a specific fitting location, wherein there is no option, from either side of the shaft, for the fitting of this full-circumference ring at the intended location.

An interference contour constitutes, for example, a bearing seat, the bearing receptacle of which has a larger diameter than the shaft diameter at the location where the protector is to be fitted, such that the protector cannot be pushed over the bearing seat on the shaft. In typical forms of embodiment, the interference contour constitutes a bearing seat for a shaft bearing.

Typically, a protector comprised of at least two annular segments for the protection of permanent magnets can be employed on shafts having no interference contours, in order to secure said magnets against displacement in an axial direction of the shaft.

A typical interference contour in the forms of embodiment is a section of a shaft which, on the grounds of the fitting of components to the shaft, is no longer accessible for the fitting of a protector which is configured as a ring. A protector comprised of at least two annular segments can provide an advantage, in that it can be fitted to the location or the section of the shaft which is no longer accessible to a protector which is configured as a ring.

For example, an interference contour can be arranged axially in the direction of the rotor axis relative to the protector, vis-à-vis the permanent magnets.

An interference contour is, for example, a shaft contour, the diameter of which renders the push-on fitting of an axial protector which is configured as a ring or as a one-piece component impossible. Examples hereof are elements on a shaft, which are positioned axially by means of a limit stop, or are secured against displacement by a protector in the axial direction of the shaft, and are typically arranged in a recess on the shaft. In a typical form of embodiment, the diameter of said elements is smaller than a diameter of a shaft bearing. For example, the diameter of said elements is smaller than a shaft diameter at the ends of the shaft. Typically, the diameter of said elements is smaller than the diameter of at least two shaft contours, which are arranged on either side of the location or section of the shaft, in the axial direction, at which the element is to be positioned or secured. Exemplary elements can be understood herein to include the following: limit stop annular elements, permanent magnets, shaft nuts or bearings.

A typical interference contour is a milled-out groove on the shaft for the fitting of magnets. The sides of the milled-out groove constitute interference contours. The protection of magnets by a one-piece protector is hindered by the presence of milled-out grooves.

In a typical form of embodiment of the invention, magnets are accommodated in axial grooves in a form-fitted manner. In forms of embodiment, magnets are secured to the rotor by adhesive bonding. In typical forms of embodiment, magnets are secured to the rotor both by form fitting and by adhesive bonding.

In typical forms of embodiment of the invention, the protector functions as a seating surface for a banding. In forms of embodiment, a banding is employed for the protection of permanent magnets. For example, a banding is wound on further to the fitting of the protector, or is push-fitted as a sleeve-type banding.

In exemplary forms of embodiment of the invention, the protector incorporates a groove, an edge or, in general, a receptacle in which a banding can be fitted or is applied. In typical rotors with a sleeve-type banding, no limit stop is provided in certain forms of embodiment.

Typically, the motor shaft comprises two sections with permanent magnets, each of which is secured on either side against axial movements by protectors. In forms of embodiment, more than two sections with permanent magnets are provided on a motor shaft, wherein each of the sections is secured on either side against displacements or movements in the axial direction of the motor shaft.

In typical forms of embodiment of the invention, the annular segments of the protector respectively execute a clamping function or a limit stop function. The annular segments are typically configured such that they can execute both a limit stop function and a clamping function.

In forms of embodiment, the annular segments are configured such that they execute either a limit stop function or a clamping function, i.e. there are typically at least two types of annular segments in these forms of embodiment. The limit stop function applies, for example, in a direction which corresponds to an axial direction of the motor shaft. The clamping function applies, for example, in an axial direction of the motor shaft. Typically, the number of the two types of annular segments is identical. In a typical form of embodiment of the invention, the number of the two types of annular segments is different, i.e. typically more clamping annular segments are employed than limit stop annular segments, or typically more limit stop annular segments are employed than clamping annular segments, by way of protection.

Typically, the joints of the limit stop annular segments and the clamping annular segments are arranged with a mutual rotation about a circumferential angle, with respect to an axis of the shaft. For example, the joints of two limit stop annular segments and two clamping annular segments respectively are essentially mutually rotated through at least 90°. The joints between the limit stop annular segments and the joints between the clamping annular segments are typically rotated about an angle of essentially at least 90° in relation to the circumferential direction of the shaft. Typically, the angle between the joints of the clamping annular segments and the joints of the limit stop annular segments, with respect to an axis of the shaft, is rotated through essentially at least 360°/(2×(number of limit stop annular segments or clamping annular segments)), or is typically rotated through no more than 360°/(2×(number of limit stop annular segments or clamping annular segments)), or is typically rotated through at least 360°/(2×(number of limit stop annular segments or clamping annular segments)).

For example, the joints of the limit stop annular segments and the clamping annular segments are mutually rotated about the shaft axis, such that the joints of the clamping and limit stop annular segments do not coincide or lie adjacently to one another. Typically, the joints are rotated by at least 5°, at least 10°, at least 20°, or no more than 90° about the shaft axis. In typical forms of embodiment of the invention, the joints of the clamping annular segments and the limit stop annular segments are mutually adjacent, or at least substantially coincide.

In typical forms of embodiment of the invention, the clamping annular segments cover a smaller proportion of the full circumference of the shaft than the limit stop annular segments. For example, the clamping annular segments are fitted such that they exercise a clamping function on only one limit stop annular segment, or bridge the joint between two limit stop annular segments and thus exercise a clamping function on two limit stop annular segments. In typical forms of embodiment, the limit stop annular segments are smaller than the clamping annular segments. Typical clamping annular segments clamp one limit stop annular segment, further typical clamping annular segments clamp two or more limit stop annular segments.

In typical forms of embodiment of the invention, the protector is fitted, or is itself secured by means of a radial screw fixing. Typically, protectors according to the forms of embodiment are axially or tangentially screwed onto the shaft, across joints in the annular segments. In general, according to the forms of embodiment, screw fixings or multiple screw fixings are possible, but are not essential.

One advantage of a radial screw fixing of the protector is that the latter can be fitted to shafts—for example, hollow shafts—in a space-saving manner.

The rotor typically comprises two, or at least two, active parts. An active part is an independent section of an arrangement of permanent magnets on the surface of a shaft, in the circumferential direction, which occupies a portion thereof viewed in the axial direction. Two active parts permit the redundant operation of the rotor in the event of external functional impairments. Two active parts can further increase the availability of the drive system. Typical forms of embodiment of the invention incorporate exactly one, or at least one, active part, with permanent magnets, on the shaft. An active part can also be described as an active section, in which magnets are fitted.

Typically, an electrical machine which employs the above-mentioned rotor is a permanent magnet-excited synchronous motor. Further examples of forms of embodiment of electrical machines include external-rotor motors.

BRIEF DESCRIPTION OF THE DRAWINGS

Exemplary embodiments of the invention are described in greater detail hereinafter, with reference to the drawings. In the drawings.

DESCRIPTION OF THE EXEMPLARY EMBODIMENTS ILLUSTRATED IN THE FIGURES

Typical exemplary embodiments of the invention are described hereinafter, wherein identical or similar components are identified by the same reference numbers, and are not further described with reference to each figure. The invention is not limited to the typical exemplary forms of embodiment described hereinafter.

Figure 1:
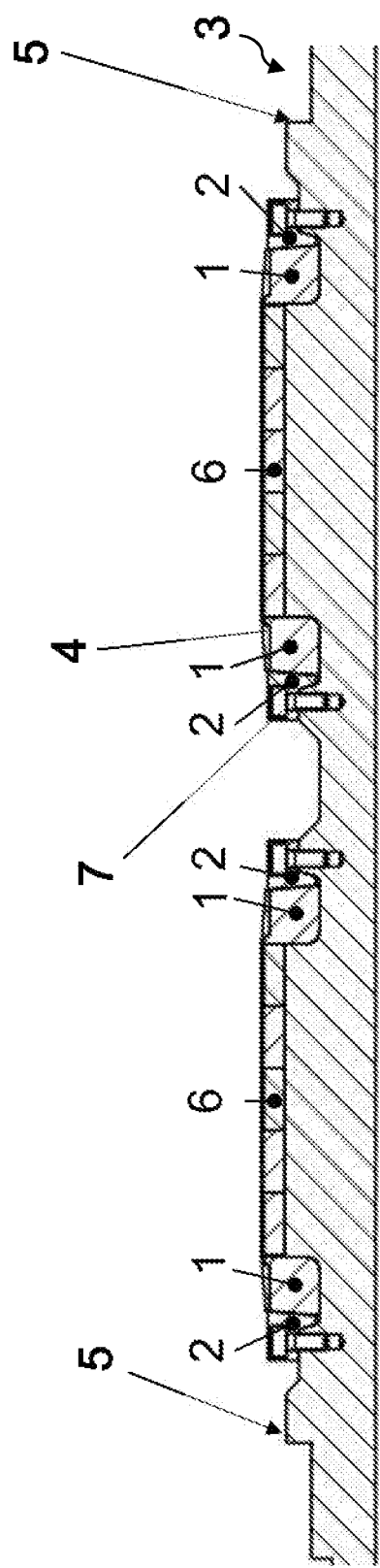
FIG. 1 shows a longitudinal section of a rotor, having two active sections, with bandings, clamping and limit stop annular segments fitted, together with magnets and interference contours.

FIG. 1 shows a schematic longitudinal section of a motor shaft 3 with two active parts, each of which comprises magnets 6. The permanent magnets 6 are axially positioned on the shaft 3, and are secured against displacement in an axial direction of the motor shaft 3, by means of limit stop annular segments 1 and clamping annular segments 2.

In the form of embodiment represented, the clamping annular segments 2, which are respectively positioned on either side of the permanent magnets, are radially secured to the shaft 3 by means of a screw fixing 7.

In further forms of embodiment, the screw fixing is executed in an axial or tangential direction.

The permanent magnets are additionally secured against radial forces by means of a banding 4. Bandings 4 are arranged on the limit stop annular segments 1.

Further typical forms of embodiment comprise two limit stop annular segments and only one clamping annular segment between two active parts.

Typically, the permanent magnets are adhesively bonded to the shaft. Typical forms of embodiment, additionally or exclusively, incorporate a form-fitted arrangement between the shaft and the permanent magnets. The above-mentioned types of assembly prevent any detachment of magnets from the shaft.

Typically, bandings are employed which, in the exemplary forms of embodiment described above, are push-fitted onto the permanent magnets in the form of sleeves, or are applied as bandings which are wound onto the permanent magnets.

The motor shaft 3 incorporates interference contours 5, each of which constitutes an axial limit stop for a shaft bearing. In further forms of embodiment, the interference contour constitutes a structure for the fitting of a position sensor.

Figure 2:
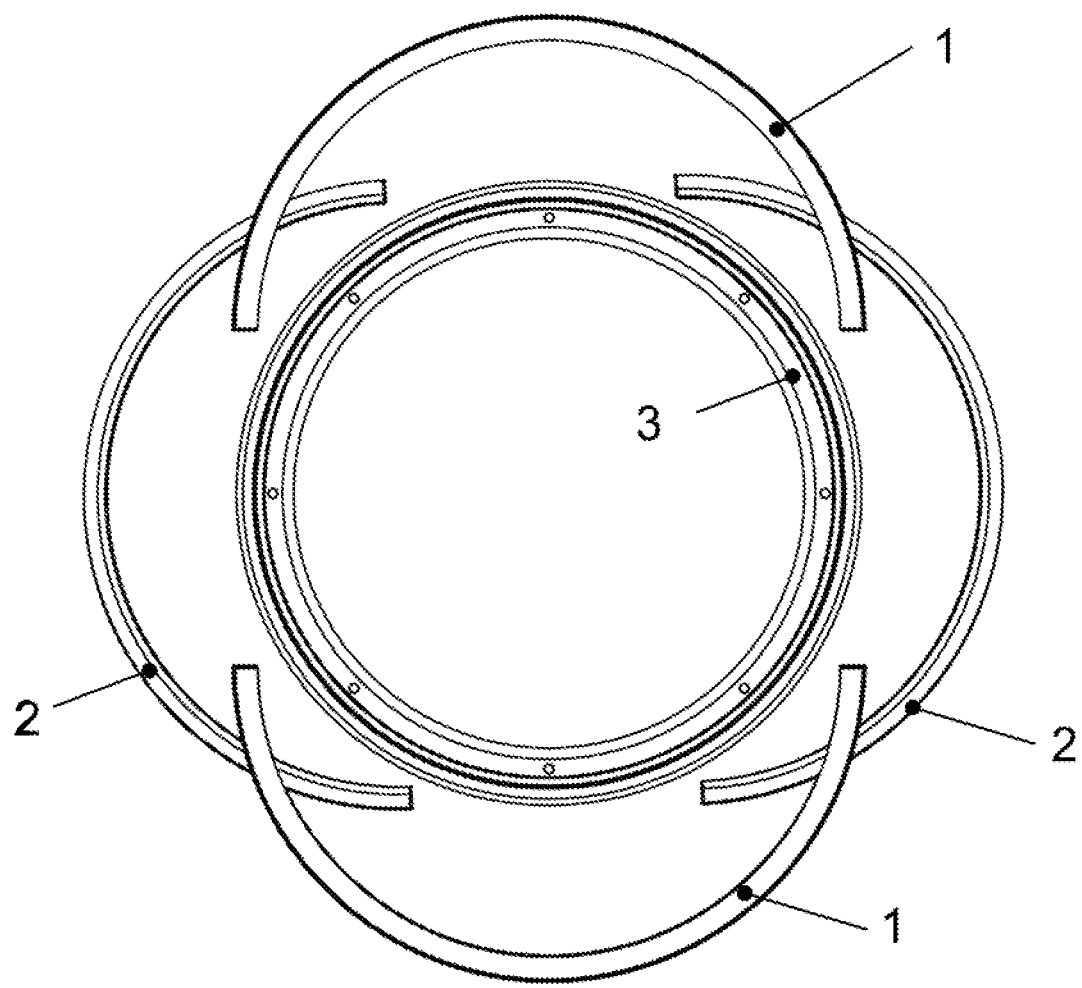
FIG. 2 shows a front view of a rotor, with clamping and limit stop annular segments prepared for fitting, which are to be fitted radially.

FIG. 2 shows a schematic view of a motor shaft 3. The motor shaft 3 of the exemplary embodiment represented in FIG. 2 is configured as a hollow shaft.

The exemplary embodiment which is represented in FIG. 2 incorporates a protector, which comprises clamping annular segments 2 and limit stop annular segments 1. The joints of the clamping annular segments 2 and the limit stop annular segments 1 are arranged with a mutual rotation of 90° about the shaft axis. In this form of embodiment, the limit stop annular segments 1 incorporate a contour for the fitting of a banding (not represented in FIG. 2).

Figure 3:
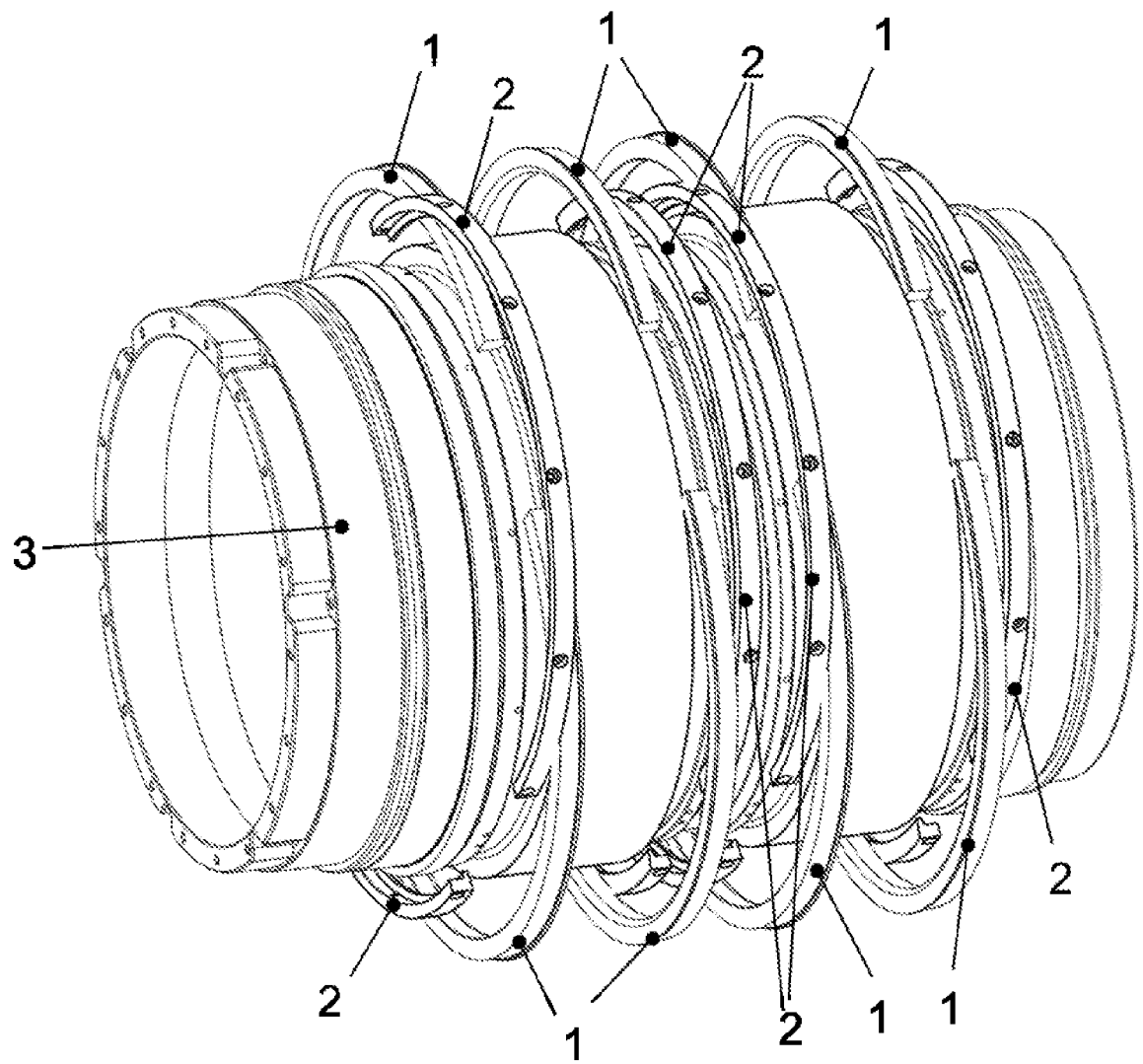
FIG. 3 shows an exploded general view of a rotor, with two active parts and respective protectors for the permanent magnets, with a protector configured as annular segments.

FIG. 3 represents the same aspects as those described with reference to the above figures, in a schematic exploded view. The exemplary embodiment represented in FIG. 3 comprises two independent active parts, each of which is secured on either side by one clamping annular segment 2 and one limit stop annular segment 1 respectively. The joints of the limit stop annular segments 1 and the clamping annular segments 2 are arranged with a mutual rotation of 90° about the axis of the shaft 3.

The exemplary form of embodiment represented in FIG. 3 comprises a motor shaft 3 which is configured as a hollow shaft. The clamping annular segments 2 of the form of embodiment represented in FIG. 3 incorporate bores for radial screw fixing to the motor shaft 3.

LIST OF REFERENCE NUMBERS

1 Limit stop annular segment
2 Clamping annular segment
3 Motor shaft
4 Banding
5 Interference contour
6 Magnets (permanent magnets)
7 Screw fixing

What is claimed is:

1. A rotor for an electrical machine, comprising a motor shaft and a distributed arrangement of permanent magnets on said motor shaft, which are secured against displacements in the axial direction of the rotor by a protector, wherein the protector comprises at least two annular segments,
wherein the annular segments of the axial protector comprise clamping annular segments, which constitute a clamping ring, and limit stop annular segments, which constitute a limit stop ring.

2. The rotor as claimed in claim 1, wherein the protector fully encloses the motor shaft, in the fitted state.

3. The rotor as claimed in claim 1, wherein the rotor comprises an interference contour.

4. The rotor according to claim 3, wherein the interference contour constitutes a bearing seat.

5. The rotor as claimed in claim 1, wherein the protector simultaneously functions as a seating surface for a configurable banding.

6. The rotor as claimed in claim 5, wherein the protector incorporates an edge on which a banding can be fitted.

7. The rotor as claimed in claim 1, wherein the motor shaft, in an axial direction of the motor shaft, comprises two sections with permanent magnets, each of which is secured on either side against axial movements by protectors.

8. The rotor as claimed in claim 1, wherein the annular segments of the protector respectively execute a clamping function and/or a limit stop function.

9. The rotor as claimed in claim 1, wherein respective joints of the limit stop annular segments and the clamping annular segments are arranged with a mutual rotation about a given angle.

10. The rotor as claimed in claim 1, wherein the clamping annular segments, and the limit stop annular segments have an at least essentially equal inner diameter.

11. The rotor as claimed in claim 1, wherein at least an axial region of the clamping annular segments, and the limit stop annular segments have an at least essentially equal inner diameter.

12. The rotor as claimed in claim 1, wherein the clamping annular segments are secured on said motor shaft by means of a radial screw fixing.

13. The rotor as claimed in claim 1, wherein the limit stop annular segments incorporates an edge on which the banding can be fitted.

14. The rotor as claimed in claim 1, wherein the motor shaft is configured in one piece, in the form of a hollow shaft.

15. The rotor as claimed in claim 1, wherein the internal diameter of the clamping annular segments and the internal diameter of the limit stop annular segments are smaller than the shaft diameter of the interference contour of the rotor.

16. An electrical machine comprising a machine housing, a stator and a rotor as claimed in claim 1.

* * * * *